(12) United States Patent
Jeon et al.

(10) Patent No.: US 11,498,621 B2
(45) Date of Patent: Nov. 15, 2022

(54) STRUCTURE OF SIDE SILL REAR PORTION OF VEHICLE

(71) Applicants: Hyundai Motor Company, Seoul (KR); Kia Corporation, Seoul (KR)

(72) Inventors: Chan Woong Jeon, Incheon (KR); Hyung Tae Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/335,298

(22) Filed: Jun. 1, 2021

(65) Prior Publication Data

US 2022/0135138 A1    May 5, 2022

(30) Foreign Application Priority Data

Nov. 4, 2020 (KR) .................. 10-2020-0146117

(51) Int. Cl.
  *B62D 25/02* (2006.01)
  *B62D 21/15* (2006.01)
(52) U.S. Cl.
  CPC ......... *B62D 25/025* (2013.01); *B62D 21/157* (2013.01)
(58) Field of Classification Search
  CPC ..... B62D 25/025; B62D 21/15; B62D 21/157

USPC ................. 296/209, 29, 30, 187.12
See application file for complete search history.

(56) References Cited

U.S. PATENT DOCUMENTS

| 8,439,428 B2* | 5/2013 | Imamura ............. B62D 25/025 |
| | | 296/193.06 |
| 8,662,575 B2* | 3/2014 | Tamura ................ B62D 25/04 |
| | | 296/209 |

FOREIGN PATENT DOCUMENTS

| DE | 102008056507 | * | 2/2019 | ............. B62D 25/02 |
| KR | 19980040574 U | * | 9/1998 | ............. B62D 25/20 |
| KR | 102142729 B1 | | 8/2020 | |

\* cited by examiner

*Primary Examiner* — Dennis H Pedder
(74) *Attorney, Agent, or Firm* — Slater Matsil, LLP

(57) ABSTRACT

An embodiment structure includes an outer panel of a side sill, an outer reinforcement member of a rear portion of the side sill coupled to an outer side of the outer panel of the side sill, an inner panel of the rear portion of the side sill coupled to an inner side of the outer panel of the side sill, and an inner reinforcement member of the rear portion of the side sill coupled to an outer side of the inner panel of the rear portion of the side sill and aligned with the outer reinforcement member of the rear portion of the side sill so that a portion of the inner reinforcement member of the rear portion of the side sill is connected to the outer reinforcement member of the rear portion of the side sill.

20 Claims, 7 Drawing Sheets

100

STRUCTURE OF SIDE SILL REAR PORTION OF VEHICLE

CROSS-REFERENCE TO RELATED APPLICATIONS

This application claims the benefit of Korean Patent Application No. 10-2020-0146117, filed on Nov. 4, 2020, which application is hereby incorporated herein by reference.

TECHNICAL FIELD

The present disclosure relates to a structure of a side sill rear portion of a vehicle.

BACKGROUND

New car safety assessments are carried out in respective countries or regions. In the new car safety assessments, safety of vehicles is evaluated through frontal crash tests, side impact tests, vehicle-to-vehicle collision tests, rollover safety tests, etc.

For example, in the U.S., which is one of the largest markets for automobiles, the Insurance Institute for Highway Safety (IIHS) administers crash safety assessments. Among the evaluation categories, the testing conditions for a side impact crashworthiness evaluation are set forth as shown in FIG. 1. A cart provided with an IIHS deformable barrier element B strikes the driver's side of a stationary test vehicle T. The cart is generally called a moving deformable barrier (MDB).

The MDB having a mass of 1,500 kg strikes the driver's side of the vehicle at an angle of 90 degrees from a longitudinal direction of the vehicle at a speed of 50 kilometers per hour (kph). An SID-IIs (a model of a human dummy manufactured for use in conducting impact tests) is seated on each of the driver's seat and the rear seat behind the driver's seat in the test vehicle T, and safety is evaluated based on a degree of injury on the SID-IIs.

Recently, the IIHS intends to strengthen test conditions in order to reflect various real-world vehicle impact modes. The changed test conditions include a 400 kg increase in the weight of the MDB compared to the existing weight, an increase in the strength of the MDB, a decrease in ground clearance, etc.

Therefore, measures to review a current vehicle frame structure and to improve ability to withstand side impacts in response to the changed test conditions of the IIHS are required.

The foregoing is intended merely to aid in the understanding of the background of the present disclosure, and is not intended to mean that the present disclosure falls within the purview of the related art that is already known to those skilled in the art.

SUMMARY

The present disclosure relates to a structure of a side sill rear portion of a vehicle. Particular embodiments relate to a structure of a side sill rear portion of a vehicle with improved ability to withstand side impacts while having a simple structure.

Embodiments of the present disclosure can solve problems associated with prior art.

An embodiment of the present invention provides a structure of a side sill rear portion of a vehicle with improved ability to withstand side impacts.

The features of embodiments of the present invention are not limited to those described above, and other unmentioned features of embodiments of the present invention will be clearly understood by a person of ordinary skill in the art from the following description.

The features of embodiments of the present invention to accomplish objects of the present invention and to perform characteristic functions of the present invention, a description of which will follow, are as follows.

One embodiment of the present invention provides a structure of a side sill rear portion of a vehicle including an outer panel of side sill, an outer reinforcement member of a rear side sill coupled to an outer surface side of the outer panel of the side sill, an inner panel of the rear side sill coupled to an inner surface side of the outer panel of the side sill, and an inner reinforcement member of the rear side sill coupled to an outer surface side of the inner panel of the rear side sill and aligned with the outer reinforcement member of the rear side sill so that a portion of the inner reinforcement member of the rear side sill is connected to the outer reinforcement member of the rear side sill.

Other aspects and preferred embodiments of the present disclosure are discussed infra.

The above and other features of embodiments of the invention are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

DETAILED DESCRIPTION OF ILLUSTRATIVE EMBODIMENTS

Figure 1:
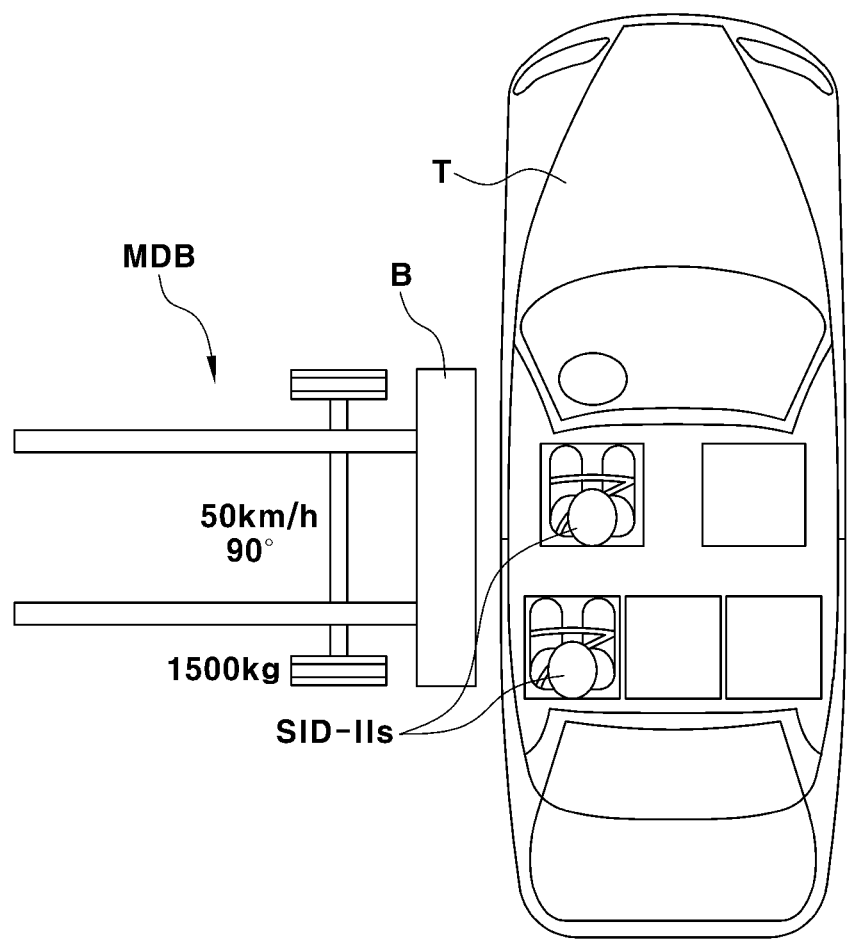
FIG. 1 is a view illustrating a side impact test conducted by the Insurance Institute for Highway Safety (IIHS) in the U.S.

Hereinafter, preferred embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

Figure 2:
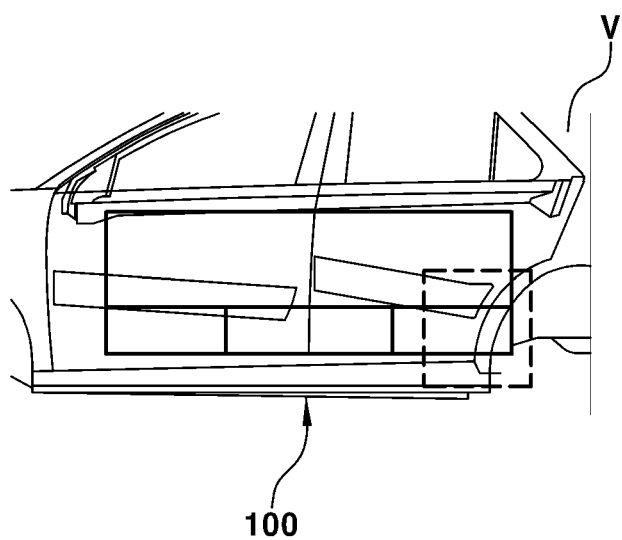
FIG. 2 is a view illustrating a side sill and a side sill rear portion of a vehicle.

Referring to FIG. 2, a side sill 100 is a member which is provided at each of both sides of the lower portion of a body of a vehicle V and serves to absorb impacts, to minimize deformation of the vehicle body, and to reduce transfer of the impacts to passengers in the event of a side crash.

Based on structural analysis of the conventional vehicle body structure under changed IIHS test conditions, it was found that the rear portion of the side sill 100 (shown in the dashed box in FIG. 2) was excessively deformed. Consequently, the existing vehicle structure cannot satisfy the changed IIHS assessment criteria, and, thus, embodiments of the present invention provide a structure of a side sill rear portion which is improved in ability to withstand side impacts.

Hereinafter reference will now be made in detail to various embodiments of the present invention, examples of which are illustrated in the accompanying drawings and described below.

Figure 3A:
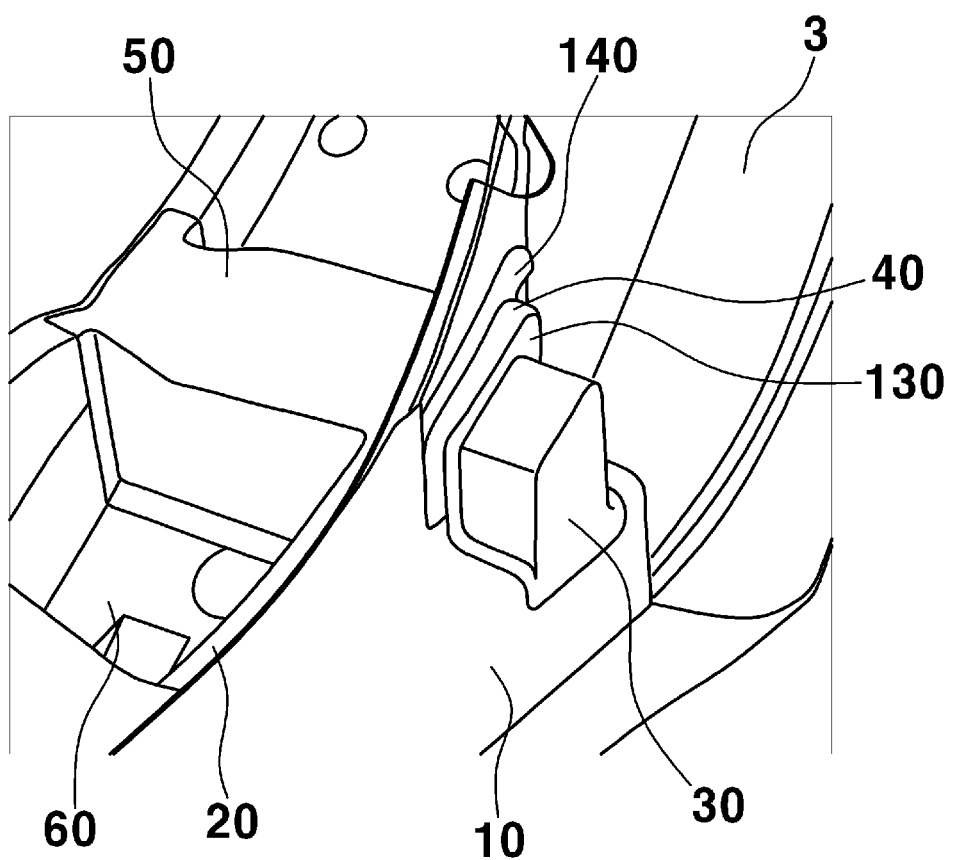
FIG. 3A is a view illustrating the structure of a side sill rear portion according to embodiments of the present invention.

Referring to FIG. 2 again, the rear portion of the side sill 100 is a part shown in the dashed box and is adjacent to a wheel housing 3. FIG. 3A is a view illustrating the structure of the side sill rear portion according to embodiments of the present invention, i.e., an enlarged view of the box part of FIG. 2.

Figure 3B:
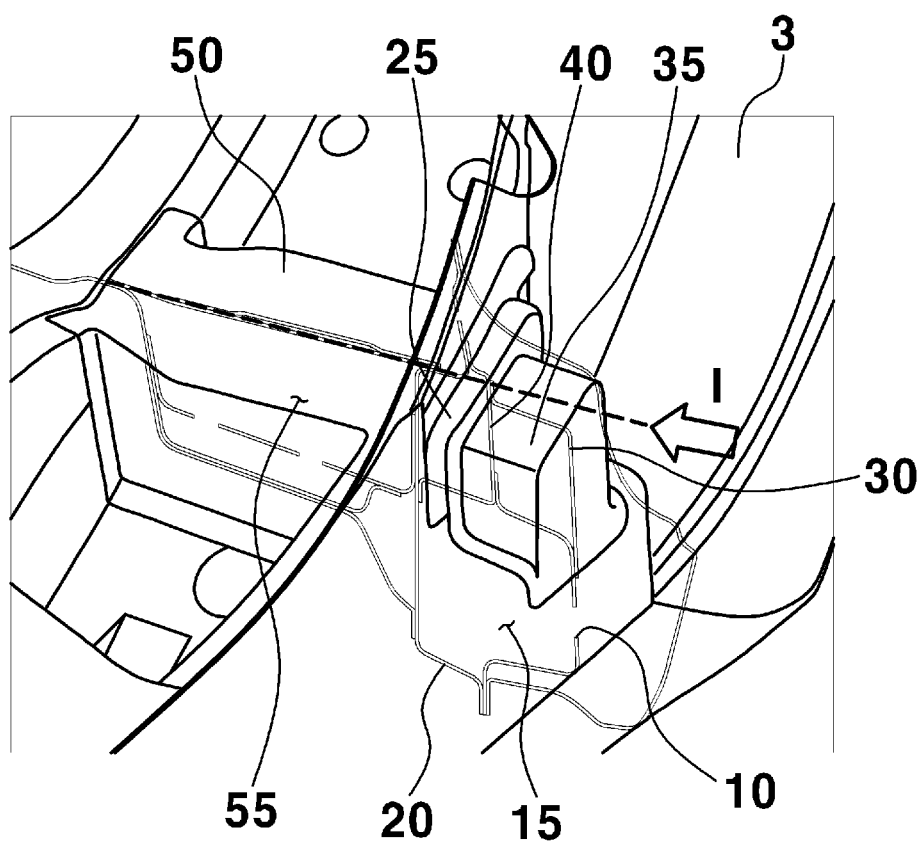
FIG. 3B is a view illustrating the structure of the side sill rear portion according to embodiments of the present invention, more precisely, showing the cross-sectional shape of the structure of the side sill rear portion.
Figure 4A:
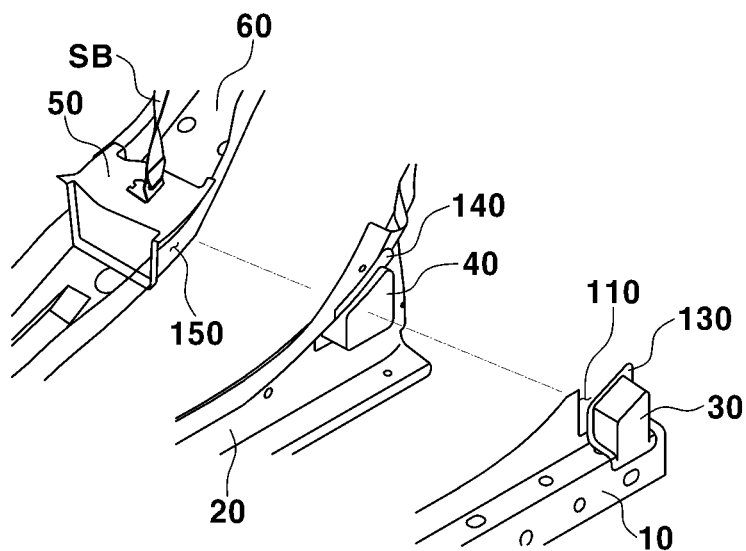
FIG. 4A is a view illustrating a process for assembling a structure of a side sill rear portion according to some embodiments of the present invention.

As shown in FIGS. 3A, 3B and 4A, an outer panel 10 of the side sill 100 is coupled to an inner panel 20 of a rear portion of the side sill 100. An outer reinforcement member 30 of the rear portion of the side sill 100 is mounted on the outer panel 10 of the side sill 100, and an inner reinforcement member 40 of the rear portion of the side sill 100 is mounted on the inner panel 20 of the rear portion of the side sill 100.

A cutout part 110 is formed in the outer panel 10 of the side sill 100. In particular, the cutout part 110 is formed on the extension line of a side impact load I. The cutout part 110 is formed by cutting out a portion of the outer panel 10 of the side sill 100.

The outer reinforcement member 30 of the rear portion of the side sill 100 is mounted on the outer surface of the outer panel 10 of the side sill 100 and is disposed to surround the cutout part 110. According to an exemplary implementation of embodiments of the present invention, the outer reinforcement member 30 of the rear portion of the side sill 100 includes a flange part 130. The flange part 130 is bent or protrudes along the circumference of the outer reinforcement member 30 of the rear portion of the side sill 100 and is provided to be coupled to other elements. A portion of the flange part 130 comes into contact with the cutout part 110, and the other portion of the flange part 130 is connected to the outer panel 10 of the side sill 100. When the outer panel 10 of the side sill 100 and the inner panel 20 of the rear portion of the side sill 100 are coupled to each other, a portion of the flange part 130 of the outer reinforcement member 30 of the rear portion of the side sill is connected to the inner reinforcement member 40 of the rear portion of the side sill 100, and the other portion of the flange part 130 is connected to the outer panel 10 of the side sill 100.

The outer reinforcement member 30 of the rear portion of the side sill 100 includes a first space 35 which is a vacant space formed therein. Therefore, the cutout part 110 and the first space 35 of the outer reinforcement member 30 of the rear portion of the side sill 100 communicate with each other. The first space 35 may be a space formed between the outer reinforcement member 30 of the rear portion of the side sill 100 and other elements coupled thereto. Here, the other elements include the outer panel 10 of the side sill 100 and the inner reinforcement member 40 of the rear portion of the side sill 100 which will be described below.

The inner panel 20 of the rear portion of the side sill 100 is coupled to the inner side of the outer panel 10 of the side sill 100, and the inner reinforcement member 40 of the rear portion of the side sill 100 is coupled to the outer side of the inner panel 20 of the rear portion of the side sill 100. According to an exemplary implementation of embodiments of the present invention, the inner reinforcement member 40 of the rear portion of the side sill 100 includes a flange part 140. The flange part 140 is bent or protrudes along the circumference of the inner reinforcement member 40 of the rear portion of the side sill 100 and is provided to be coupled to other elements. The flange part 140 is connected to the outer side of the inner panel 20 of the rear portion of the side sill 100, and the inner reinforcement member 40 of the rear portion of the side sill 100 includes a second space 25 which is a vacant space formed therein. According to an exemplary implementation of embodiments of the present invention, the second space 25 may be a space formed by coupling the inner reinforcement member 40 of the rear portion of the side sill 100 and the inner panel 20 of the rear portion of the side sill to each other.

The inner reinforcement member 40 of the rear portion of the side sill 100 is configured to come into contact with the outer panel 10 of the side sill 100 and the outer reinforcement member 30 of the rear portion of the side sill 100 when the outer panel 10 of the side sill 100 and the inner panel 20 of the rear portion of the side sill 100 are coupled to each other. When the outer panel 10 of the side sill 100 and the inner panel 20 of the rear portion of the side sill 100 are coupled to each other, the flange part 130 of the outer reinforcement member 30 of the rear portion of the side sill 100, which contacts the cutout part 110, is connected to the inner reinforcement member 40 of the rear portion of the side sill 100. In more detail, a portion of the cutout part 110 that is not in contact with the flange part 130 is connected to the inner reinforcement member 40 of the rear portion of the side sill.

The inner panel 20 of the rear portion of the side sill 100 is coupled to the outer side of a rear floor side member 60. The outer panel 10 of the side sill 100 is disposed at the outer side of the inner panel 20 of the rear portion of the side sill 100, and the rear floor side member 60 is disposed at the inner side of the inner panel 20 of the rear portion of the side sill 100.

Figure 4B:
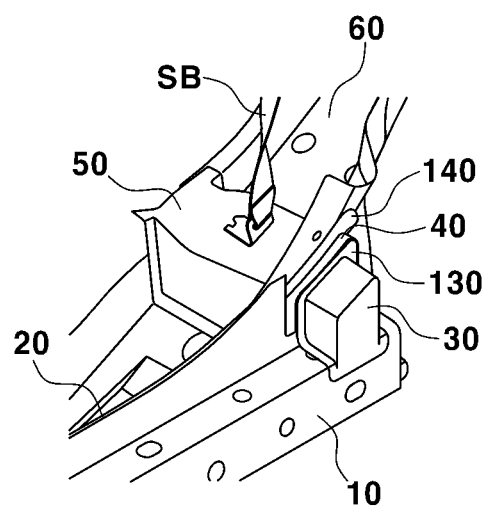
FIG. 4B is a view illustrating the structure of the side sill rear portion according to some embodiments of the present invention.

The rear floor side member 60 may include a support element 50 disposed on the extension line of the side impact load I. According to an exemplary implementation of embodiments of the present invention, as shown in FIG. 4B, the support element 50 may be a side mounting bracket for a seat belt SB of a rear seat of the vehicle. However, the support element 50 is not limited to the side mounting bracket for the seat belt SB and may employ any member which may provide reinforcement. That is, embodiments of the present invention have the advantage of providing additional reinforcing force against an impact load using the structures around the side sill rear portion. As will be described below, a seat belt mounting part 13 has not been installed at the side sill rear portion to which a side impact load I is directly applied in the existing technology.

The support element 50 includes a third space 55 which is a vacant space formed therein and is coupled to the rear floor side member 60. The outer reinforcement member 30 of the rear portion of the side sill 100, the inner reinforcement member 40 of the rear portion of the side sill 100 and the support element 50 are disposed in such a way that the first space 35, the second space 25 and the third space 55 are aligned to coincide with the direction of the impact load. The first space 35, the second space 25 and the third space 55 are aligned in such a way that they at least partially overlap each other.

According to one embodiment of the present invention, an opening 150 is formed on the side of the support element 50 coupled to the inner panel 20 of the rear portion of the side sill 100. The rear floor side member 60 is coupled to the inner panel 20 of the rear portion of the side sill 100 such that the opening 150 is closed by the inner panel 20 of the rear portion of the side sill 100. Particularly, the rear floor side member 60 is coupled to the inner panel 20 of the rear portion of the side sill 100 such that the opening 150 is aligned with the inner reinforcement member 40 of the rear portion of the side sill 100. Consequently, the outer reinforcement member 30 of the rear portion of the side sill 100, the inner reinforcement member 40 of the rear portion of the side sill 100 and the support element 50 overlap with each other and are aligned to coincide with the direction of the impact load I.

A fourth space 15, which is a vacant space, is formed between the outer panel 10 of the side sill 100 and the inner panel 20 of the rear portion of the side sill 100. In more detail, the fourth space 15 may be formed by coupling the outer panel 10 of the side sill 100, the inner panel 20 of the rear portion of the side sill 100, and the inner reinforcement member 40 of the rear portion of the side sill 100.

As shown in FIG. 3B, the structure of the side sill rear portion according to embodiments of the present invention forms a plurality of box structures having a plurality of vacant spaces. As described above, the fourth space 15 is formed as the outer panel 10 of the side sill 100 is coupled to the inner panel 20 of the rear portion of the side sill 100. Further, the inner reinforcement member 40 of the rear portion of the side sill 100 includes the second space 25 formed between the inner reinforcement member 40 of the rear portion of the side sill 100 and the inner panel 20 of the rear portion of the side sill 100. The outer reinforcement member 30 of the rear portion of the side sill 100 is coupled to the outer panel 10 of the side sill 100 and the inner reinforcement member 40 of the rear portion of the side sill 100 and forms the first space 35. Further, the support element 50, which is hollow, includes the third space 55 formed therein.

Figure 5:
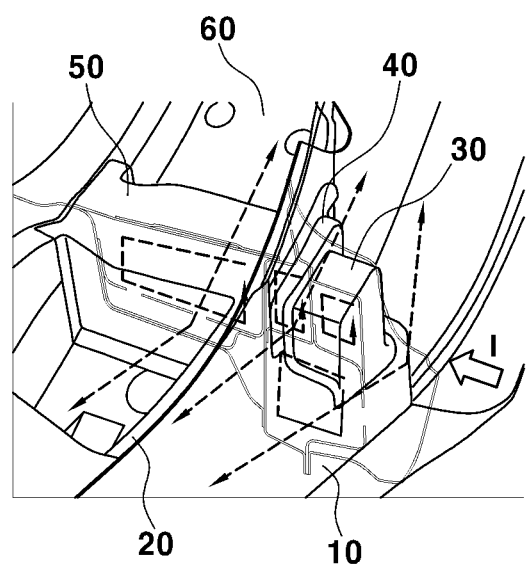
FIG. 5 is a view illustrating distribution paths of an impact load applied to the structure of the side sill rear portion according to embodiments of the present invention.

FIG. 5 is a view illustrating the impact load I applied to the structure of the side sill rear portion according to embodiments of the present invention and distribution paths of the impact load I through the structure of the side sill rear portion according to embodiments of the present invention, indicated by the arrows. The impact load I applied to the side sill rear portion is effectively distributed to both sides through the spaces 15, 25, 35 and 55 which are disposed to be aligned with the impact load I.

Figure 6A:
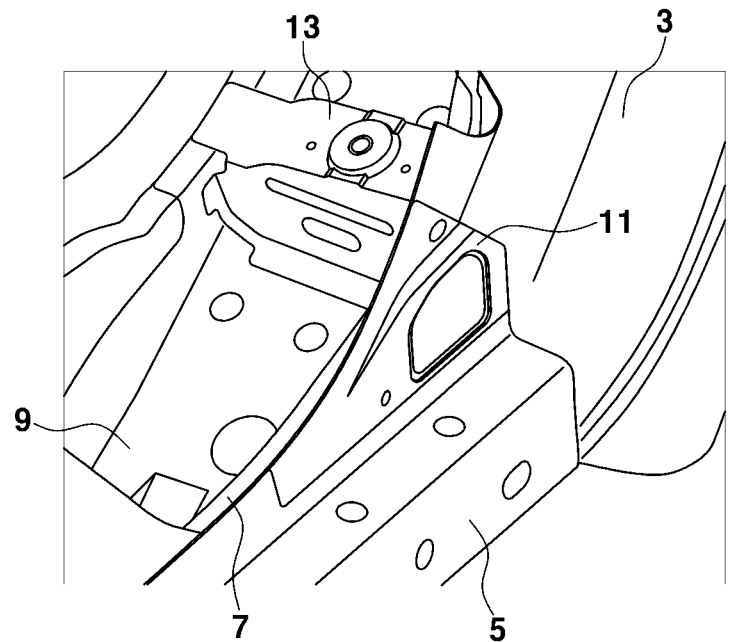
FIG. 6A is a view illustrating a conventional structure of a side sill rear portion.
Figure 6B:
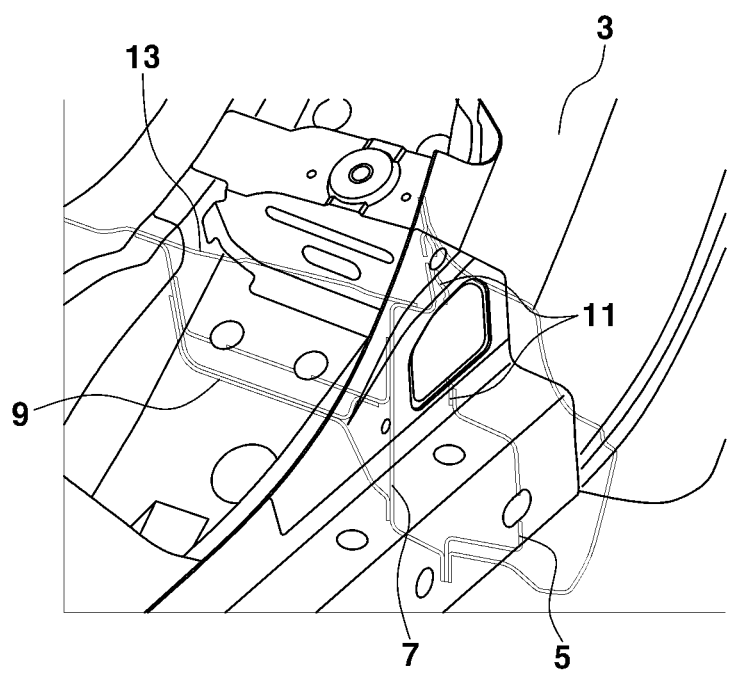
FIG. 6B is a view illustrating the conventional structure of the side sill rear portion of FIG. 6A, more precisely, showing the cross-sectional shape of the conventional structure of the side sill rear portion.

As shown in FIGS. 6A and 6B, conventionally, an outer panel 5 of a side sill, an inner panel 7 of a rear portion of the side sill and an outer reinforcement member 11 of the rear portion of the side sill form the structure of a side sill rear portion, and the structure of the side sill rear portion structure is coupled to a rear floor side member 9. Further, a seat belt mounting part 13 for mounting a seat belt SB is provided inside the rear floor side member 9.

The conventional structure was insufficient to absorb impact energy with respect to input of a side impact load. The load distribution was ineffective due to disconnection of the outer reinforcement member 11 of the rear portion of the side sill. Further, conventionally, the seat belt mounting part 13 was not provided on the side sill rear portion to which the side impact load I is directly applied and did not serve as an absorber of the impact load I.

In contrast, according to embodiments of the present invention, the above described external load support structure and load distribution structure can enhance resistance to side impacts.

Further, in embodiments of the present invention, since the outer reinforcement member 30 of the rear side sill, the inner reinforcement member 40 of the rear side sill, and the support element 50 are disposed on the same extension line, lateral impact loads can be distributed longitudinally.

In embodiments of the present invention, the connection between the outer reinforcement member 30 of the rear side sill, the inner reinforcement member 40 of the rear side sill and the support element 50 are rendered stronger and the coupling rigidity of the vehicle body can be improved. This ultimately enhances the rigidity of the vehicle body, the noise, vibration and harshness (NVH) performance of the vehicle body, and the strength of the seat belt may be improved.

According to embodiments of the present invention, the support element 50 or the seatbelt side mounting bracket for the seat belt can not only improve the ability to withstand impacts but also can perform the conventional function of mounting the seatbelt, thereby allowing functional integration and structural simplification.

Further, according to embodiments of the present invention, the outer reinforcement member 30 of the rear side sill can function as a member for improving the ability to withstand impacts, and the inner reinforcement member 40 of the rear side sill may be additionally provided to further improve the ability to withstand impacts.

Further, according to embodiments of the present invention, the ability to withstand impacts may be improved through a simplified structure having low complexity, and a light-weight structure may be realized.

As is apparent from the above description, embodiments of the present invention provide a structure of a side sill rear portion of a vehicle which may improve the ability to withstand side impacts.

It should be understood that the present disclosure is not limited to the above described embodiments and the accompanying drawings, and various substitutions, modifications, and alterations can be devised by those skilled in the art without departing from the technical spirit of the present disclosure.

What is claimed is:

1. A structure of a rear portion of a side sill of a vehicle, the structure comprising:
   an outer panel of the side sill;
   an outer reinforcement member of the rear portion of the side sill coupled to an outer side of the outer panel of the side sill;
   an inner panel of the rear portion of the side sill coupled to an inner side of the outer panel of the side sill; and
   an inner reinforcement member of the rear portion of the side sill coupled to an outer side of the inner panel of the rear portion of the side sill and aligned with the outer reinforcement member of the rear portion of the side sill so that a portion of the inner reinforcement member of the rear portion of the side sill is connected to the outer reinforcement member of the rear portion of the side sill.

2. The structure of claim 1, further comprising a support element mounted on a rear floor side member coupled to an inner side of the inner panel of the rear portion of the side sill and positioned in alignment with the outer reinforcement member of the rear portion of the side sill and the inner reinforcement member of the rear portion of the side sill.

3. The structure of claim 2, wherein the outer reinforcement member of the rear portion of the side sill, the inner reinforcement member of the rear portion of the side sill, and the support element are aligned with an extension line of an impact load.

4. The structure of claim 2, wherein the support element includes a side mounting bracket configured to mount a seatbelt of a rear seat of the vehicle.

5. The structure of claim 1, wherein the outer panel of the side sill comprises a cutout part formed by removal of a portion of the outer panel of the side sill, wherein the cutout part is configured to be surrounded by the outer reinforcement member of the rear portion of the side sill.

6. The structure of claim 5, wherein a portion of the outer reinforcement member of the rear portion of the side sill is connected to the inner reinforcement member of the rear portion of the side sill via the cutout part.

7. The structure of claim 5, wherein the outer reinforcement member of the rear portion of the side sill comprises a first flange part formed along a circumference of the outer reinforcement member of the rear portion of the side sill.

8. The structure of claim 7, wherein a first portion of the first flange part is connected to the outer panel of the side sill, and a second portion of the first flange part is connected to the inner reinforcement member of the rear portion of the side sill.

9. The structure of claim 7, wherein the inner reinforcement member of the rear portion of the side sill comprises a second flange part formed along a circumference of the inner reinforcement member of the rear portion of the side sill and connected to the inner panel of the rear portion of the side sill.

10. The structure of claim 1, wherein the inner reinforcement member of the rear portion of the side sill comprises a flange part formed along a circumference of the inner reinforcement member of the rear portion of the side sill and connected to the inner panel of the rear portion of the side sill.

11. A structure of a rear portion of a side sill of a vehicle, the structure comprising:
    an outer panel of the side sill;
    an outer reinforcement member of the rear portion of the side sill coupled to an outer side of the outer panel of the side sill;
    an inner panel of the rear portion of the side sill coupled to an inner side of the outer panel of the side sill;
    an inner reinforcement member of the rear portion of the side sill coupled to an outer side of the inner panel of the rear portion of the side sill and aligned with the outer reinforcement member of the rear portion of the side sill so that a portion of the inner reinforcement member of the rear portion of the side sill is connected to the outer reinforcement member of the rear portion of the side sill;
    a support element mounted on a rear floor side member coupled to an inner side of the inner panel of the rear portion of the side sill and positioned in alignment with the outer reinforcement member of the rear portion of the side sill and the inner reinforcement member of the rear portion of the side sill;
    a first space between the outer reinforcement member of the rear portion of the side sill and the inner reinforcement member of the rear portion of the side sill;
    a second space between the inner reinforcement member of the rear portion of the side sill and the inner panel of the rear portion of the side sill; and
    a third space formed in the support element,
    wherein the outer reinforcement member of the rear portion of the side sill, the inner reinforcement member of the rear portion of the side sill, and the support element are aligned with an extension line of an impact load.

12. The structure of claim 11, wherein the first space, the second space, and the third space are aligned with the extension line of the impact load.

13. The structure of claim 11, further comprising a fourth space between the outer panel of the side sill, the inner panel of the rear portion of the side sill, and the inner reinforcement member of the rear portion of the side sill.

14. A vehicle comprising:
- a side sill extending along a lower side of the vehicle in a longitudinal direction of the vehicle;
- an outer reinforcement member of a rear portion of the side sill coupled to an outer side of an outer panel of the side sill;
- an inner panel of the rear portion of the side sill coupled to an inner side of the outer panel of the side sill;
- an inner reinforcement member of the rear portion of the side sill coupled to an outer side of the inner panel of the rear portion of the side sill and aligned with the outer reinforcement member of the rear portion of the side sill so that a portion of the inner reinforcement member of the rear portion of the side sill is connected to the outer reinforcement member of the rear portion of the side sill;
- a rear floor side member coupled to an inner side of the inner panel of the rear portion of the side sill; and
- a support element mounted on the rear floor side member and positioned in alignment with the outer reinforcement member of the rear portion of the side sill and the inner reinforcement member of the rear portion of the side sill.

15. The vehicle of claim 14, wherein the outer reinforcement member of the rear portion of the side sill, the inner reinforcement member of the rear portion of the side sill, and the support element are aligned with an extension line of an impact load.

16. The vehicle of claim 14, wherein the support element includes a side mounting bracket configured to mount a seatbelt of a rear seat of the vehicle.

17. The vehicle of claim 14, wherein the outer panel of the side sill comprises a cutout part formed by removal of a portion of the outer panel of the side sill, wherein the cutout part is configured to be surrounded by the outer reinforcement member of the rear portion of the side sill.

18. The vehicle of claim 17, wherein a portion of the outer reinforcement member of the rear portion of the side sill is connected to the inner reinforcement member of the rear portion of the side sill via the cutout part.

19. The vehicle of claim 17, wherein the outer reinforcement member of the rear portion of the side sill comprises a flange part formed along a circumference of the outer reinforcement member of the rear portion of the side sill, and wherein a first portion of the flange part is connected to the outer panel of the side sill, and a second portion of the flange part is connected to the inner reinforcement member of the rear portion of the side sill.

20. The vehicle of claim 14, wherein the inner reinforcement member of the rear portion of the side sill comprises a flange part formed along a circumference of the inner reinforcement member of the rear portion of the side sill and connected to the inner panel of the rear portion of the side sill.

* * * * *